United States Patent

Ness et al.

[11] Patent Number: 4,649,666
[45] Date of Patent: Mar. 17, 1987

[54] SELF-STABILIZING TREE SUPPORT ASSEMBLIES

[76] Inventors: Ervin D. Ness, 2754 N. George St., York, Pa. 17402; Walter E. Shorter, Belmar Circle, R.D. #2, Dallastown, Pa. 17313

[21] Appl. No.: 783,135

[22] Filed: Oct. 2, 1985

[51] Int. Cl.⁴ ............................................. A01G 17/06
[52] U.S. Cl. ................................. 47/43; 47/46; 47/44
[58] Field of Search ................... 47/42, 43, 44, 45, 46, 47/47, 76; 248/322; 24/17 A, 17 B, 17 AD, 20 E, 20 S

[56] References Cited

U.S. PATENT DOCUMENTS

| | | | |
|---|---|---|---|
| 1,051,208 | 1/1913 | Fletcher. | |
| 1,619,791 | 3/1927 | Fitch et al.. | |
| 2,660,349 | 11/1953 | Bernau. | |
| 2,867,056 | 1/1959 | Berger | 47/43 |
| 3,010,256 | 11/1961 | Ise. | |
| 3,040,477 | 6/1962 | June. | |
| 3,226,882 | 1/1966 | Lichtenthaler. | |
| 3,526,056 | 9/1970 | Stropkay | 47/42 |
| 4,318,246 | 3/1982 | Jungbluth | 47/42 |
| 4,319,428 | 3/1982 | Fox | 47/42 |
| 4,562,662 | 1/1986 | Ten Pas | 47/43 |

FOREIGN PATENT DOCUMENTS 4999 of 1912 United Kingdom .................... 47/44

Primary Examiner—Robert A. Hafer
Assistant Examiner—Bradley M. Lewis

[57] ABSTRACT

A tree support of self-stabilizing type including a pair of yeildable assemblies each comprising a first hook adapted to be attached to the upper portion of a stake, a second hook having a yieldable covering adapted to be attached to the trunk of a tree to be stabilized, and a tension spring having opposite ends respectively connected to the aforementioned hooks and extending therebetween. The pair of yieldable assemblies are connected between a tree to be stabilized and a pair of similar vertical stakes spaced at opposite sides of the tree and spaced from the tree sufficiently that the springs of the assemblies are under at least limited tension and the assemblies being operable to return the tree to initial vertical position regardless of the direction in which the tree is swayed by wind or otherwise.

3 Claims, 3 Drawing Figures

SELF-STABILIZING TREE SUPPORT ASSEMBLIES

BACKGROUND OF THE INVENTION

The present invention pertains to an arrangement for stabilizing trees, particularly young trees, when the same are planted without rigidly securing the same to supporting stakes and the like in conventional manner.

It has been customary for a long period of time when planting trees to drive one or more stakes into the ground, usually fairly close to the tree, and extending wires or cables between the trunk of the tree and such stakes. In regard to young trees, such as of those of the order of an inch or more in diameter at the trunk, stakes of the order of four or five feet in length are used and wires are extended between the trunk of the tree and the stakes at appropriate elevations, the portions of the wire which extend around the trunk of the tree usually being covered by sections of rubber hose and the like.

When older trees of a height, for example, of fifteen or twenty feet or more, are transplanted, it is customary under such circumstances to drive a number of stakes into the ground at suitable distances from the tree and extend guy wires between the trunk of the tree and said stakes, the wires and stakes being arranged in radially-spaced arrangement around the tree to afford rigid support thereto. Examples of this type are illustrated in prior U.S. Patents:

U.S. Pat. No. 1,051,208—Fletcher, dated Jan. 21, 1913
U.S. Pat. No. 3,040,477—June, dated June 26, 1962
U.S. Pat. No. 4,319,428—Fox, dated Mar. 16, 1982

In the foregoing patents, there is illustrated either cables or rods which extend between hooks or loops in the opposite ends of the wires or rods and the length of the latter is adjustable by appropriate means illustrated in the patents.

Heretofore, under certain circumstances, only a single stake has been employed which is extended vertically into the ground adjacent the tree and connecting means which extend between the trunk of the tree and the posts secure the tree against movement, such as when blown by the wind or otherwise. Examples of this type of arrangement are illustrated in the following U.S. Patents:

U.S. Pat. No. 3,010,256—Ise, dated Nov. 28, 1961
U.S. Pat. No. 3,226,882—Lichtenthaler, dated Jan. 4, 1966

In the Ise patent, a wire-like member covered by elastic means, is looped around the trunk of the tree and is otherwise secured to a stake in vertically-adjustable manner. In the Lichterthaler patent, a strip described as being of flexible material, such as rubber or the like, is shown extending between and around the trunk of the tree and an adjacent stake in a FIG. 8 arrangement in one embodiment, while in other embodiments the supporting strip is merely extended loop-like around the trunk of the tree and the supporting stake. It appears that primarily in the Lichtenthaler patent, the rubber-like strip is for protection against injury to the trunk of the tree, rather than permitting any latitude in relative movement between the supporting stake and the tree.

The present invention provides support for a tree of a different nature from those described in the above-mentioned patents and affords certain advantages thereover, details of which are set forth below:

SUMMARY OF THE INVENTION

One of the principal advantages of the present invention is to provide means for supporting a tree against any substantial movement from a preferred vertical position by utilizing self-stabilizing devices comprising a pair of yieldable assemblies, each including a first hook adapted to be attached to a stake of which a pair extend vertically at opposite sides of a tree and in spaced relationship thereto, a second hook adapted to be attached to the trunk of the tree which is to be stabilized, and a tension spring connected at opposite ends respectively between said hooks, said second hook and spring of said assemblies respectively extending in opposite horizontal direction away from the tree when connected to said stakes, whereby the pair of yieldable assemblies permit a limited amount of lateral movement of the trunk of the tree, such as caused by winds and the like, but the tension springs function to restore the trunk of the tree to its original position regardless of the direction in which the trunk has swayed by influences of the atmosphere.

It is a further object of the invention to mount said yieldable assemblies in such manner that the spaces of the stakes from the tree are such that when the assemblies are mounted as described, the springs will be under limited tension adequate to maintain the hooks on opposite ends of the assemblies respectively in firm engagement with the trunk of the tree and the stakes.

Another object of the invention is to include upon the hooks which at least partially surround the trunk of a tree yieldable means, such as a tube or the like of elastomeric material in order to prevent the possibility of injury to the bark of the tree.

A further object of the invention is to form the hooks from relatively stiff metallic wire capable of normally retaining the initial shape, but also being of such nature as to permit limited bending of the hooks so as to comprise shorter radii, if desired, and thereby effectively more closely encircle the trunk of a tree and a post to facilite stabilizing the position of the hooks with respect to the tree and stakes.

Still another object of the invention is to mount the hooks on one end of each yieldable assembly which engage the trunk of a tree preferably in close vertical abutment whereby, when the springs to which the hooks are connected extend in opposite directions toward the posts, the tree will be completely encircled by the hooks, and particularly be engaged by the elastomeric material mounted upon the hooks.

One further object of the invention is to form the hooks which engage the trunk of a tree so as to be substantially semicircular and extend a greater amount than 180° around an arcuate center of the hook, and one end of said hook also terminating in a small loop attachable to one end of the tension spring of said assemblies.

Still another object of the invention is to provide with said pair of yieldable assemblies at least a pair of stakes of commensurate length with the height of the tree to be supported thereby and of a diameter or cross-dimension substantially equal to the diameter of the trunk of the tree supported thereby.

Details of the foregoing objects and of the invention, as well as other objects thereof, are set forth in the following description and illustrated in the accompanying drawing comprising a part of the application:

DETAILED DESCRIPTION OF THE PREFERRED EMBODIMENTS

While the present invention is capable of being manufactured in different sizes respectively to adapt the yieldable assemblies thereof to different diameters of trees, the present invention primarily finds its greatest use in regard to supporting in yieldable manner relatively young trees, which are more susceptible to being blown by winds in a manner to damage the same than older trees which are of a generally stronger nature. One of the difficulties encountered in supporting the trunks particularly of relatively young trees in a rigid manner, such as currently undertaken by the use of two or more stakes and rigid wires extending between the trunk and stakes, is that when so rigidly supported, strong winds are capable of blowing the the upper portions of the trees and damaging the same due to the non-yieldability of the trunk of the tree and this difficulty is obviated by using the present invention.

Figure 1:
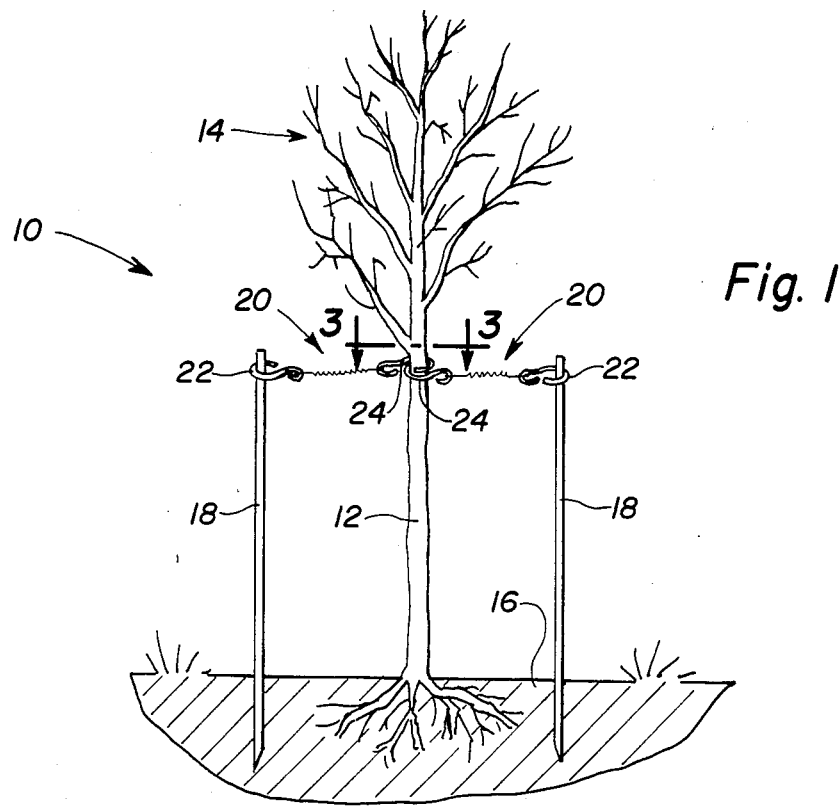
FIG. 1 is an exemplary vertical elevation illustrating the preferred manner of use of the invention, and shows a pair of yieldable assemblies extending between the upper ends of a pair of posts at opposite sides of the tree with the yieldable assemblies mounted in tensioned position respectively between the trunk of the tree and said pair of posts, the ground in which the roots of the tree are being shown in section.

Referring to FIG. 1, a tree 10 is illustrated in exemplary manner and comprises a substantially vertical trunk 12 and the upper foliage portion 14, the roots of the tree extending into earth soil 16, which is shown in section. Preferably, similar stakes 18 of a length commensurate with the height of the main trunk portion 12 of the tree are driven into the soil 16, as shown in FIG. 1, and the stakes are mounted at opposite sides of the trunk 12 in spaced relationship to the trunk an adequate amount to enable the yieldable assemblies 20 to be mounted in at least a partially tensioned manner, as described in detail below.

Figure 2:
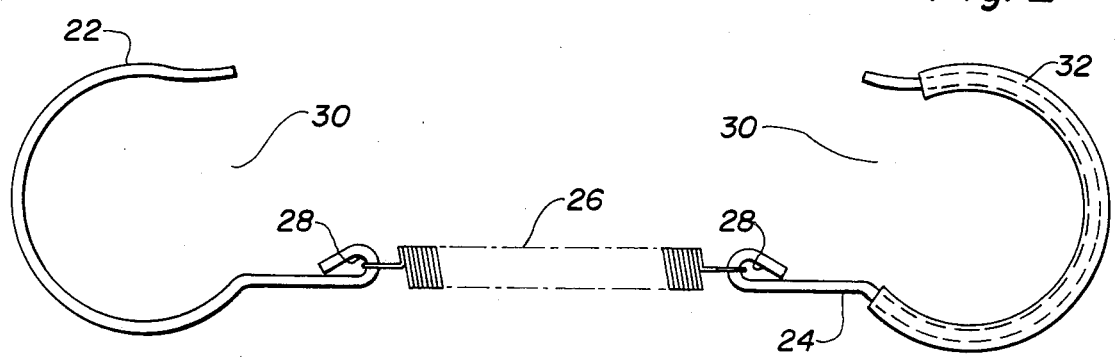
FIG. 2 is an enlarged plan view showing the preferred hooks of the yieldable assemblies connected to the opposite ends of a tension spring.

Referring to FIG. 2, the preferred construction of the yieldable assemblies 20 is illustrated in detail, said assemblies comprising a first hook 22, a second hook 24, and a coiled tension spring 26, of which the opposite ends respectively are connected to small loops 28 formed on one end of each hook. As clearly seen from FIG. 2, the hooks are substantially semi-circular and actually extend around an imaginary arcuate center a greater amount than 180°, whereby the throat 30 of each hook preferrably is less than the diameter of the hook.

It is to be understood also that the sizes of the hooks 22 and 24, as well as the tensile strength of the spring 26, may be varied, especially in order to adapt the use of the yieldable assemblies to support trees of a reasonable range of different diameters of trunk, as well as height of the tree. Under such circumstances, however, it is preferred that the hooks 22 and 24 be formed from relatively stiff wire material and bent into the shape substantially as illustrated, for example, in FIGS. 2 and 3. However, the type of wire selected also should permit at least limited bending of the hooks, if desired, to close the throat 30 of each hook a limited amount so as to permit engagement of the hooks more closely respectively with the stakes 18 and trunk 12 of the tree. The so-called second hook 24, which is that which surrounds the trunk of the tree, preferrable encased, at least for the major portion of its length, within yieldable means 32, which, for example, is selected from yieldable elastomeric material, and preferably in tubular form, the inner diameter of said tube preferably being only slightly greater than the diameter of the wire from which the hook 24 is formed.

Figure 3:
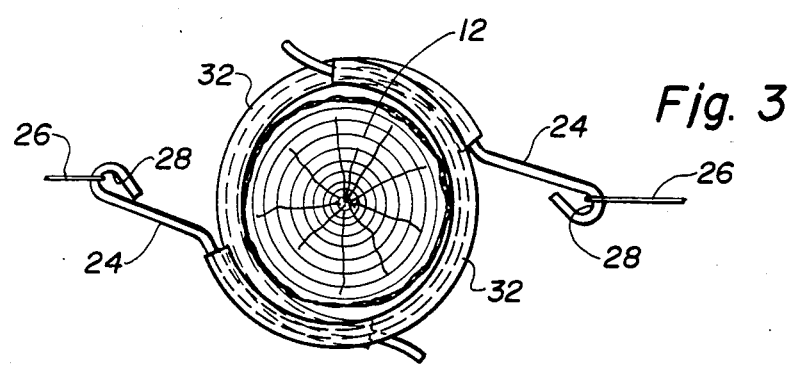
FIG. 3 is a fragmentary view taken on the line 3—3 of FIG. 1 and showing the manner in which a pair of hooks of the assemblies which surround the tree are positioned in a manner to completely encircle the tree as a result of the hooks being disposed in abutting relationship and springs to which they are connected extending in opposite directions from the axis of the tree.

Referring to FIG. 3, which is taken on the section line 3—3 of FIG. 1, in larger scale than employed in FIG. 1, it will be seen that a pair of the second hooks 24, which are encased within the yieldable means 32, are disposed preferably in vertical abutting relationship relative to the axis of the trunk 12 of the tree, and with the springs 26 and small loops 28 respectively extending in opposite directions from the axis of the trunk of the tree 12, it will be seen that the trunk 12 is completely encircled by the cooporative position of the hooks 24. Due to the fact that the springs 26 also are mounted initially at least under limited tension, due to the proper spacing of the stakes 18 from the trunk 12, there is no reasonable possibility of the hooks 24 becoming disconnected from engagement with the trunk 12, except possibly under most severe storm conditions. However, such disconnection may be further avoided by bending the hooks 24 to provide a throat 30 of lesser dimension and thereby more closely encircle the trunk of the tree by said hooks.

Due to the nature of the invention as described above, it should be apparent that only a maximum of two posts 18 and a pair of the flexible assemblies 20 are required to maintain a tree in desired vertical position while permitting limited swaying of the trunk 12 of the tree in any direction, which swaying will be permitted to a reasonable limit due to expansion of the tension springs 26, while the force of said springs is adequate to restore the tree to its initial substantially vertical position, and thus, no more than pairs of the stakes 18 and yieldable assemblies 20 are needed to effect such yieldable positioning of the tree. Nevertheless, the invention need not be restricted to using a pair of stakes, together with a pair of yieldable assemblies 20, in the event some circumstances may exist where the use of more than such pairs would be useful and desirable.

The present invention also adapts itself to compact packaging of a pair of said yieldable assemblies adapted for ready display and may be sold either as such, or together with a pair of stakes, and thus rendering the invention highly saleable.

The foregoing description illustrates preferred embodiments of the invention. However, concepts employed may, based upon such description, be employed in other embodiments without departing from the scope of the invention. Accordingly, the following claims are intended to protect the invention broadly, as well as in the specific forms shown therein.

We claim:

1. A self-stabilizing tree support including in combination, a pair of similar elongated stakes adapted to be driven at one end into the ground and respectively being vertical and parallel to opposite sides of a tree to be supported therebetween in similarly spaced relation to said sides of a tree, at least a pair of yieldable assemblies each comprising in combination, a first hook adapted to be attached to one of said stakes adjacent a tree to be stabilized against swaying, a second hook adapted to be attached to the trunk of a tree to be stabilized, said hooks being subtantially semicircular and etending a greater amount than 180°-around an arcuate center and each of said hooks terminating in a small loop, and an elongated subtantially straight tension spring member connected at opposite ends respectively to said small loops of said hooks, said assemblies respectively being adapted to be connected between a tree to be supported and said pair of vertical stakes respectively spaced similar predetermined distances from opposite sides of said tree in a manner by which said springs of said assemblies initially are placed under a limited amount of initial tension and adapted to restore the tree to a desired initial vertical position after being swayed by wind or other means in any direction, said pair of similar stakes each having a length commensurate with the height of the location on the trunk of a tree where said second hooks engage it to be stabilized and having a diameter relatively similar to the diameter of the tree to be stabilized by said assemblies and stakes and the first hook of each assembly being attached to the uppermost portions of said stakes opposite the location on the trunk of the tree where the second hooks of said assemblies are attached thereto.

2. The tree support according to claim 1 in which at least said second hook of said assemblies is formed from wire which is relatively stiff but capable of being bent to permit the hook to be changed to a radius smaller than the initial shape to effect close partial encirclement of the trunk of a tree to be stabilized and thereby minimize disengagement of said second hook from such trunk.

3. The tree support according to claim 1 in which said second hooks of said yieldable assemblies are adapted to be placed around the trunk of a tree in vertical abutment with each other whereby when the springs to which they are connected extend in opposite direction from said hooks the trunk of the tree will be entirely surrounded by said hooks and thereby stabilize the position of said hooks upon the trunk of the tree.

* * * * *